J. E. LEA.
ANTIVAPOR GLAND.
APPLICATION FILED MAR. 30, 1909.

924,618.

Patented June 8, 1909.

Witnesses:-
W. P. Burk
R. R. Christie Jr.

Inventor:-
James Edward Lea
By his Attorney:- M. Wallace White

UNITED STATES PATENT OFFICE.

JAMES EDWARD LEA, OF MANCHESTER, ENGLAND.

ANTIVAPOR-GLAND.

No. 924,618.

Specification of Letters Patent.

Patented June 8, 1909.

Application filed March 30, 1909. Serial No. 486,738.

*To all whom it may concern:*

Be it known that I, JAMES EDWARD LEA, a subject of the King of Great Britain and Ireland, and resident of Manchester, England, have invented a new or Improved Antivapor-Gland Chiefly for Use with Measuring and Recording Apparatus, of which the following is a specification:

In using the instrument forming the subject of Letters Patent No. 815102 A. D. 1906 in the measurement of water from which steam is rising, as in the case of water of condensation from an engine, there is a liability of the steam vapor entering the casing of the instrument and tarnishing or corroding, and therefore interfering with the proper working of, the metal parts. A similar difficulty arises when the instrument is used in the measurement of chemical liquids from which fumes arise, and even under ordinary conditions moisture from the atmosphere is liable to enter the casing and interfere with the instrument. The vapor enters the casing through the opening in which works the float rod, and as such rod requires to be perfectly free to move up and down, it follows that an ordinary packed joint cannot be used owing to excessive friction. To overcome the difficulty this invention consists in using two plates, each faced up to a true plane, and, when lying face to face, adapted to prevent the passage of any vapor or gaseous substance between them. The plates are each formed with a central aperture and when in position lie around the float rod, but while the aperture in one is only very slightly larger than the float rod, the aperture in the other is somewhat larger. The plate with the larger aperture is fixed to the casing of the instrument and lies around the opening through which the float rod passes. The plate with the smaller aperture is loose and rests upon the fixed plate. With the plates thus arranged and their surfaces lying in contact they afford an effective seal against the ingress of vapor, etc., into the casing. The fixed plate is preferably flanged and slightly cupped so as to serve in holding a supply of oil, which finding its way between the contacting faces of the plates serves to lubricate them, and also to create a suction by which the loose plate is prevented readily leaving the fixed plate. The loose plate is also cupped or counter-sunk for the reception of oil, which finding its way in film form between the plate and rod closes the space between the rod and plate.

Figure 2:
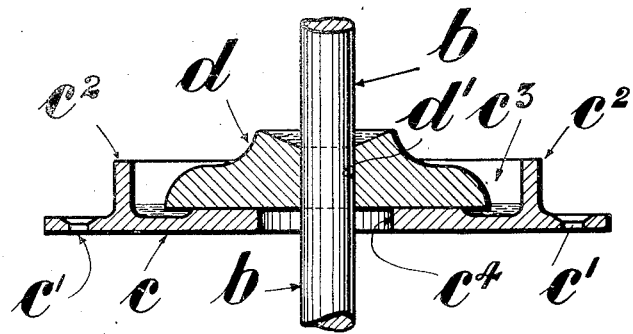
Figure 1:
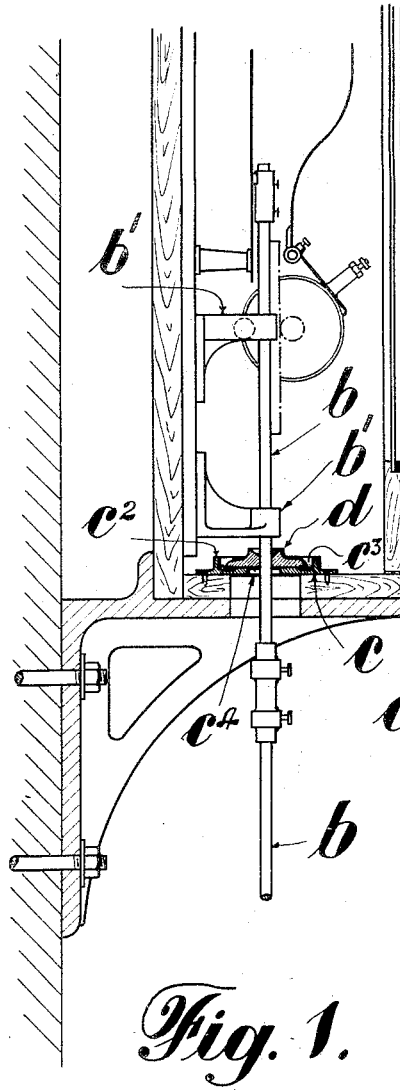
Figure 3:
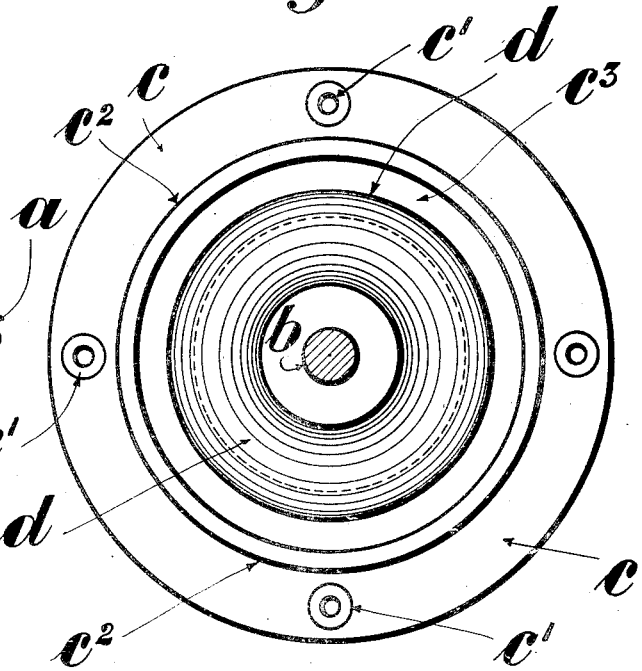

Upon the accompanying drawing, Figure 1 illustrates a vertical cross-section of the recording instrument forming the subject of the said prior patent, with the present invention shown applied thereto. Figs. 2 and 3 illustrate, to a larger scale, the improved anti-vapor gland separately in transverse sectional elevation and plan respectively.

As shown, $a$ is the floor of the casing in which the recording instrument is inclosed.

$b$ is the float rod, which is guided loosely in brackets $b'$.

$c$ is the fixed gland plate and $d$ is the loose gland plate. The contacting faces of the plates are made to a true plane, consequently little or nothing can pass between them. The plate $c$ is provided with screw holes $c'$ for enabling it to be fixed to the floor $a$. It is also formed with a flange $c^2$ and with a recessed part $c^3$, whereby the plate may form an oil cup. Centrally in the plate is the orifice $c$ which in diameter is larger than the float rod $b$.

In the plate $d$ is the central orifice $d'$ which in diameter is such as to allow the plate to fit the rod as closely as possible while allowing it to be free to remain at rest while the rod moves up or down. The plate $d$ is fairly thick in order to have sufficient weight to remain on the plate $c$. Owing to the close contact of the plates, and especially when coated with a thin film of oil, there is also a slight suction to counter-act any tendency of the plate $d$ to rise.

By this invention the exclusion of vapor, etc., from the interior of the recorder casing is very complete. Prior to the use of the invention any vapor entering the casing caused a rusting of the metal parts, and, what was more serious, a disfigurement of the record, inasmuch that the ink used was caused to run and give a blurred outline.

What I claim is:—

In the recording instrument herein referred to and including the casing for inclosing such instrument in the floor of which is an orifice, and also including the rod which passes through the said orifice, the combination therewith of a plate having a central orifice and a slightly raised face around the said orifice and also having an upstanding annular flange lying concentric to the orifice, such plate being fixed to the floor of the said casing and concentrically to the orifice therein, and a further plate of smaller diameter than the inner diameter of the said annular flange and loosely resting upon the raised face of the first named plate, and such further plate upon its under face being also formed to a true plane, and having a central orifice, the said rod passing loosely through the orifices in the two plates, and the orifice in the fixed plate being such as to allow of any lateral movement of the rod while that of the loose plate is only such as to allow the rod to move vertically through it, substantially as herein set forth.

In witness whereof I have hereunto set my hand in the presence of two witnesses.

JAMES EDWARD LEA.

Witnesses:
 F. C. PENNINGTON,
 P. D. BAILEY.